United States Patent [19]
Kishimoto

[11] Patent Number: 5,841,392
[45] Date of Patent: Nov. 24, 1998

[54] PULSE-ECHO RANGING SYSTEM WITH IMPROVED TARGET

[75] Inventor: Hiroshi Kishimoto, Kanagawa-ken, Japan

[73] Assignee: Nikon Corporation, Tokyo, Japan

[21] Appl. No.: 724,214

[22] Filed: Oct. 1, 1996

[30] Foreign Application Priority Data

Oct. 2, 1995 [JP] Japan ................................. 7-278450
Oct. 2, 1995 [JP] Japan ................................. 7-278451

[51] Int. Cl.⁶ ........................................... G01S 13/32
[52] U.S. Cl. ........................... 342/125; 342/128; 342/6
[58] Field of Search .................... 342/118, 125, 342/126, 128, 6

[56] References Cited

U.S. PATENT DOCUMENTS

| | | | |
|---|---|---|---|
| 3,908,189 | 9/1975 | Buehler et al. | 342/33 |
| 4,104,634 | 8/1978 | Gillard | 342/7 |
| 4,134,008 | 1/1979 | De Courlieu et al. | 342/6 X |
| 4,283,725 | 8/1981 | Chisholm | 342/174 |
| 4,314,249 | 2/1982 | Onoe | 342/6 |
| 4,660,046 | 4/1987 | Foral | 342/160 |
| 4,698,636 | 10/1987 | Marlow et al. | 342/104 |
| 4,723,123 | 2/1988 | Marlow et al. | 342/6 |
| 4,806,932 | 2/1989 | Bechtel | 342/33 |
| 5,077,557 | 12/1991 | Ingensand | 342/52 |
| 5,233,357 | 8/1993 | Ingensand et al. | 342/352 |
| 5,319,373 | 6/1994 | Maxwell et al. | 342/55 |
| 5,345,243 | 9/1994 | Levis | 342/173 |
| 5,361,070 | 11/1994 | McEwan | 342/21 |
| 5,379,045 | 1/1995 | Gilbert at al. | 342/357 |
| 5,465,094 | 11/1995 | McEwan | 342/28 |
| 5,471,218 | 11/1995 | Talbot et al. | 342/357 |
| 5,477,228 | 12/1995 | Tiwari et al. | 342/357 |
| 5,502,641 | 3/1996 | Isomura | 364/449 |
| 5,512,905 | 4/1996 | Nichols et al. | 342/357 |
| 5,519,403 | 5/1996 | Bickley et al. | 342/352 |
| 5,519,620 | 5/1996 | Talbot et al. | 364/449 |
| 5,612,864 | 3/1997 | Henderson | 364/167.01 |

FOREIGN PATENT DOCUMENTS

| | | | | |
|---|---|---|---|---|
| 4-151509 | 5/1992 | Japan | | G01C 15/00 |
| 4-151510 | 5/1992 | Japan | | G01C 15/00 |

OTHER PUBLICATIONS

Stover, Dawn, "Radar on a chip — 101 Uses In your Life", *Popular Science*, pp.107–117.

*Primary Examiner*—John B. Sotomayor
*Attorney, Agent, or Firm*—Cushman Darby Cushman IP Group of Pillsbury Madison & Sutro LLP

[57] ABSTRACT

A pulse-echo ranging system includes an improved target and a ranging device which emits pulses of electromagnetic radiation toward the target and receives pulses reflected from the target. The target is provided with a modulating mechanism for modulating the reflected pulses in a predetermined manner. The modulating mechanism allows the ranging device to distinguish pulses truly reflected from the target from noise and pulses reflected from objects other than the target. More specifically, the modulating mechanism may include a reflector which reflects the pulses at plural distances from the ranging device. The reflector may include a single reflective surface coupled to an oscillating vibrator, or plural reflective surfaces spaced at different locations from the ranging device.

5 Claims, 4 Drawing Sheets

PULSE-ECHO RANGING SYSTEM WITH IMPROVED TARGET

BACKGROUND OF THE INVENTION

1. Related Application Data

This disclosure is related to Japanese Patent Applications 07-278450, filed Oct. 2, 1995 and 07-278451, filed Oct. 2, 1995. The content of each of these documents is hereby expressly incorporated herein by reference in its entirety.

2. Field of the Invention

The present invention is related to a pulse-echo ranging system, i.e., a system which transmits pulses of electromagnetic radiation (e.g., in the radio frequency portion of the electromagnetic spectrum) toward a target, and receives pulses reflected off of the target.

3. Description of Background Information

Ranging systems which use light waves have generally been known. A measuring apparatus may be provided which emits pulses of light toward a target, and receives and measures pulses of light reflected by the target. The distance from the distance measuring apparatus to the target can be determined based upon the time delay between the time at which the light pulse is emitted to the time at which the reflected light pulse is received.

Another type of distance measuring apparatus emits modulated light toward the target. The modulated light is reflected from the target back toward the distance measuring apparatus. The distance from the distance measuring apparatus to the target is determined based upon the amount of phase shift between the emitted modulated light and the received modulated light.

Each of these ranging systems encounters difficulties in that reflective objects located behind or near the target may adversely affect the accuracy with which the distance is determined.

SUMMARY OF THE INVENTION

The present invention is provided to improve upon pulse-echo ranging systems and which form part of the same. In order to achieve this end, one or more aspects of the invention may be followed in order to bring about one or more specific objects and advantages, such as those noted below.

One object of the present invention is to provide a ranging system which avoids distance measurement errors caused by reflections from a reflective object located behind or near a target.

The present invention, therefore, is directed to a pulse-echo ranging system or method. The system includes a target positioned at a measurement location, and a ranging device. The ranging device includes a transmitter for emitting pulses of electromagnetic radiation toward the target, and a receiver for receiving reflected pulses comprising the pulses reflected from the target toward the ranging device. The target comprises a modulating mechanism for modulating the reflected pulses in a predetermined manner.

In accordance with a further aspect of the present invention, the ranging device comprises a radar device for emitting and receiving radio frequency electromagnetic radiation. The modulating mechanism may comprise a reflector which reflects the pulses at plural distances from the ranging device. The reflector may comprise first and second reflective surfaces. The first reflective surface is at a position closer to the ranging device than a position of the second reflective surface.

In accordance with a further aspect of the present invention, the first reflective surface is semi-transparent to the pulses, and the second reflective surface is not transparent to the pulses. Accordingly, the first reflective surface creates a first set of reflected pulses, and the second reflective surface creates a second set of reflected pulses. The ratio of the intensity of reflected pulses of the first set to the intensity of reflected pulses of the second set may be a predetermined value.

The pulse-echo ranging system may further comprise a mechanism for adjusting an amount of distance between the first and second reflective surfaces.

In accordance with another aspect of the present invention, the reflector comprises a reflective surface, and the modulating mechanism further comprises a vibrator for moving the reflective surface along a direction facing the ranging device. The target may further include a frequency adjustor for adjusting a frequency of oscillation of the vibrator in accordance with a location at which the target is positioned. In the alternative, the target may comprise a tilt sensor the detecting an amount of tilt of the reflective surface to produce a tilt value, and a frequency setter for setting a frequency of oscillation of the vibrator in accordance with the tilt value produced by the tilt sensor.

BRIEF DESCRIPTION OF THE DRAWINGS

The above and other objects, features, and advantages of the present invention are further described in the detailed description which follows, with reference to the drawings by way of non-limiting exemplary embodiments of the present invention, wherein like reference numerals represent similar parts throughout the several views, and wherein.

DETAILED DESCRIPTION OF THE EXEMPLARY EMBODIMENTS

Figure 1:
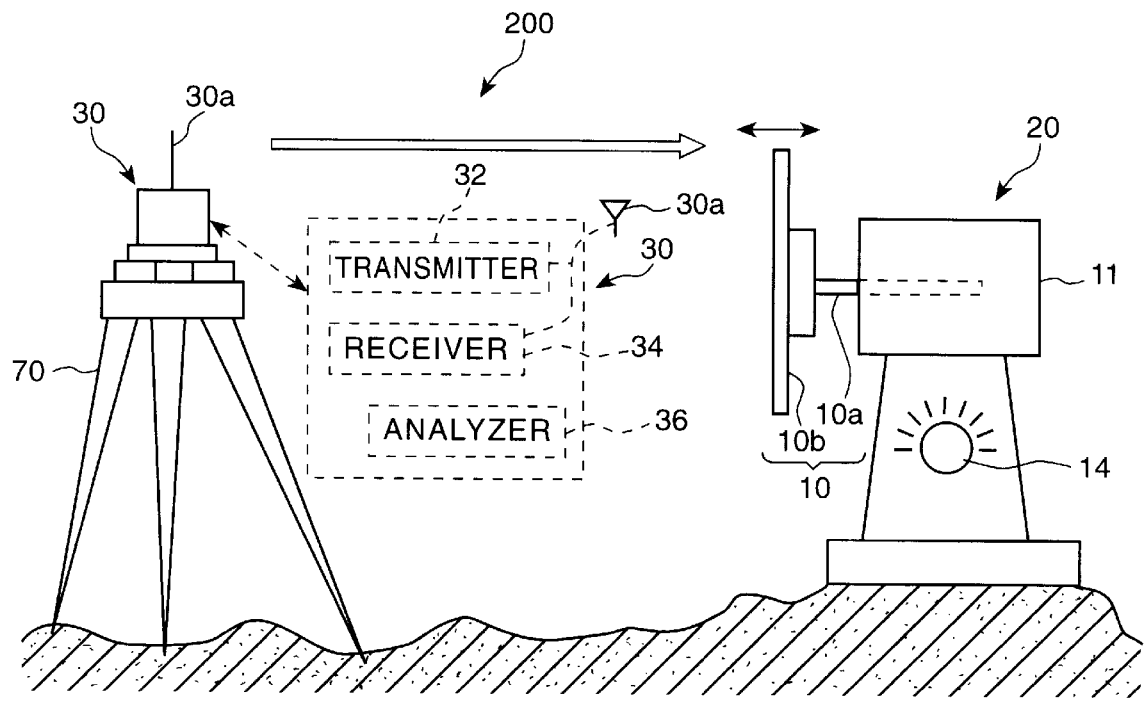
FIG. 1 illustrates a pulse-echo ranging system in accordance with a first embodiment of the present invention.

Referring now to the drawings in greater detail, FIG. 1 shows a pulse-echo ranging system 200 in accordance with a first embodiment of the present invention. The illustrated pulse-echo ranging system 200 includes a radar device 30 and a target 20. Target 20 is positioned at particular measurement location. Radar device 30 is placed at a reference position or location, and includes an antenna 30a, together with a transmitter 32, a receiver 34, and an analyzer 36. Transmitter 32 emits, via antenna 30a, electromagnetic pulses toward target 20, and receiver 34 receives via antenna 30a, reflected pulses which include pulses reflected from target 20 toward radar device 30. Analyzer 36 analyzes the relationship between transmitted and reflected pulses in order to calculate a distance between radar device 30 and target 20. In addition, or alternatively, analyzer 36 may perform other ranging calculations.

As shown in FIG. 1, radar device 30 is mounted on a tripod 70, which is placed at a particular reference location.

Radar device 30 may, for example, comprise a micropower impulse radar (MIR) device. MIR is disclosed, for example, in U.S. Pat. Nos. 5,361,070 (McEwan) and 5,465,094 (McEwan). A chip utilizing such technology is further described in an article published in the March 1995 edition of Popular Science, at pages 107–110 and 116–117. The content of each of U.S. Pat. Nos. 5,465,094 and 5,361,070 is hereby expressly incorporated by reference herein in its entirety. The content of the Popular Science article at pages 107–110 and 116–117 is hereby expressly incorporated by reference herein in its entirety.

Such an MIR device can output very short electromagnetic pulses, each having a pulse width of less than $1 \times 10^{-9}$ seconds, covering a very wide frequency band with a center frequency in the GHz range. Meanwhile, the radiation level of such a device can be near 1 microwatt. In addition, the size of such a device can be quite small.

Target 20 includes, among other elements, a reflector 10 which reflects pulses it receives from radar device 30 back toward radar device 30. More specifically, as can be viewed in FIG. 1, target 20 includes a reflector 10 and a target body 11. A frequency adjustor dial 14 is positioned on a side portion of target body 11. Reflector 10 includes a support shaft 10a, supported within target body 11, and a reflective surface 10b. Target body 11 supports shaft 10a which is fixed to a rear side of reflector 10, and shaft 10a is movable along a direction facing radar device 30 (indicated by an arrow in FIG. 1). A vibrator 12 (shown in FIG. 2) is coupled to shaft 10a, and vibrates reflector 10 along the direction facing radar device 30, i.e., along the direction of the arrow shown in FIG. 1.

Figure 2:
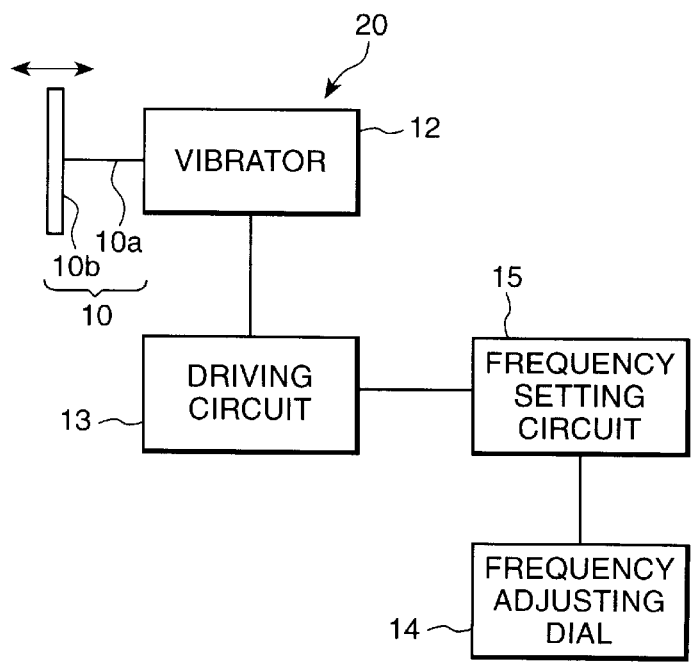
FIG. 2 is a block diagram schematically illustrating the structure of a target which may be used in the pulse-echo ranging system illustrated in FIG. 1.

Target 20 is shown in FIG. 2 as including a reflector 10, a vibrator 12, a driving circuit 13, a frequency setting circuit 15, and a frequency adjusting dial 14. Driving circuit 13 is connected to vibrator 12, and drives vibrator 12 at a frequency set by frequency setting circuit 15. Frequency adjuster dial 14 is provided to facilitate manual adjustment or setting of a frequency of vibration, and frequency setting circuit 15 sets the frequency at which driving circuit 13 will drive vibrator 12 to vibrate reflector 10. More specifically, driving circuit outputs a signal which corresponds to the frequency selected by frequency adjusting dial 14. Vibrator 12 and driving circuit 13 comprise a vibration mechanism for vibrating reflector 10 along the direction facing the radar device.

The operation of the pulse-echo ranging system 200 illustrated in FIG. 1 will now be described.

Target body 11 is positioned so that reflective surface 10b of reflector 10 coincides with the station position, and is substantially vertical and directly opposing radar device 30.

The vibration frequency of reflector 10 is set by adjusting frequency adjustor dial 14, so that reflector 10 will vibrate (oscillate) along the direction facing the radar device 30 at a predetermined frequency.

Radar device 30 emits electromagnetic pulses toward target 20, and reflected pulses are created as reflector 10 is being vibrated in a direction facing radar device 30. Accordingly, the reflected electromagnetic pulses contain a low frequency component which corresponds to the frequency of vibration of reflector 10.

Other "noise" pulses may be received by radar device 30, which are created by reflections from objects other than target 10. However, the "noise" pulses do not contain the low frequency component created by the vibration of reflector 10, and can therefore be distinguished from the true reflected pulses.

Analyzer 36 may determine the distance from radar device 30 to target 20 based upon the delay between when an electromagnetic pulse is emitted from radar device 30 until radar device 30 receives a true reflected pulse identified as coming from target 20.

As described above, a modulating mechanism may be provided which modulates the reflected pulses in a predetermined manner. In the first embodiment, a vibrator 12 is provided which imparts a unique low frequency component on the pulses reflected by the target 20. Such a modulating mechanism can increase the accuracy and reliability of distance measurements, by helping the ranging device (e.g., radar device 30) distinguish true reflected pulses from noise pulses, which may be caused, for example, by reflective objects located behind or near target 20.

Frequency adjustor dial 14 can be used to set the frequency of vibration of reflector 10 to one of a plurality of different values. Accordingly, if more than one measurement station (i.e., target) is provided, each measurement station can be assigned a unique identifier by setting, with adjustor dial 14, it to have a unique vibration frequency. Radar device 30 can then identify reflected pulses of a particular measurement station based upon the low frequency component imparted on the reflected pulses.

Figure 3:
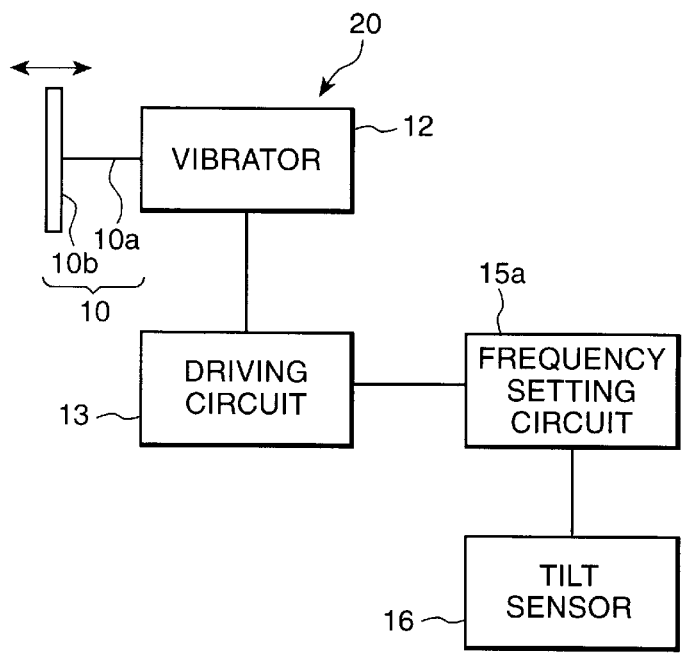
FIG. 3 is a block diagram of a target which may form part of the pulse-echo ranging system illustrated in FIG. 1, in accordance with a second embodiment of the present invention.

FIG. 3 is a block diagram of a target 20 which may form part of the pulse-echo ranging system 200 illustrated in FIG. 1, in accordance with a second embodiment of the present invention. As shown in FIG. 3, target 20 comprises, among other elements, a reflector 10, a vibrator 12, a driving circuit 13, a frequency setting circuit 15a, and a tilt sensor 16. Reflector 10 comprises a reflective surface 10b supported by a shaft 10a. Shaft 10a is coupled to a vibrator 12. Driving circuit 13 drives vibrator 12 to oscillate at a frequency set by frequency setting circuit 15a. Frequency setting circuit 15a controls the frequency at which vibrator 12 is oscillated based upon a value output by a tilt sensor 16.

In the embodiment illustrated in FIG. 2, a frequency adjusting dial 14 is used to control the frequency value set by the frequency setting circuit. Tilt sensor 16 may be implemented so that it detects the amount of tilt of reflective surface 10b of the reflector 10 and outputs a tilt value (i.e., a tilt angle of reflecting surface 10b). That tilt value is then input to frequency setting circuit 15b. If reflective surface 10b of reflector 10 is exactly vertical, the tilt angle will be zero.

The oscillation frequency of vibrator 12 may vary in accordance with the tilt value output by tilt sensor 16. Accordingly, if the oscillation frequency of vibrator 12 is a certain value corresponding to a tilt angle of zero, the radar device 30 will assume that the orientation or tilt of reflective surface 10b is perfectly vertical, and if the frequency corresponds to a tilt value greater than or less than zero, the amount of tilt of reflective surface 10b can be taken into account by analyzer 36, by simply determining the precise frequency of the low frequency component contained in the reflected electromagnetic pulses received by radar device 30. By providing a tilt sensor 16 as shown in the embodiment of FIG. 3, radar device 30 may compensate for variations in the tilt of reflective surface 10b, which provides more flexibility in the manner in which target 20 is set up at a measurement location. In other words, reflective surface 10b of reflector 10 need not be precisely vertical.

Figure 4:
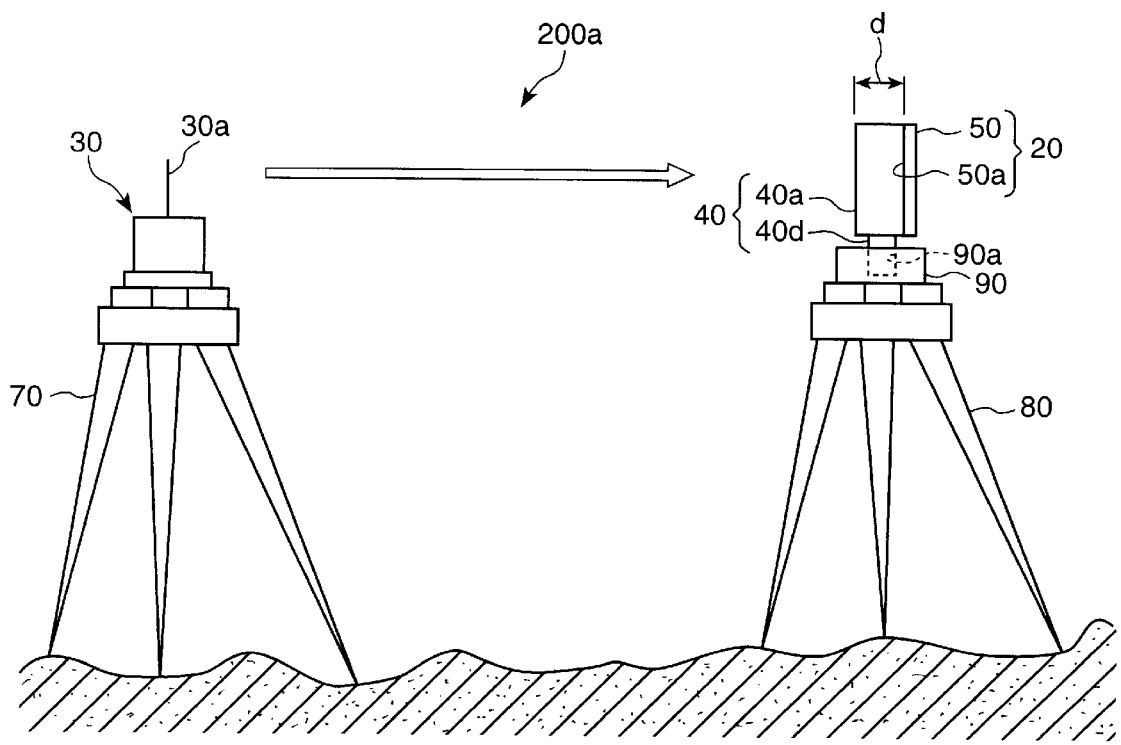
FIG. 4 illustrates a pulse-echo ranging system in accordance with a third embodiment of the present invention.

FIG. 4 shows a pulse-echo ranging system 200a in accordance with a third embodiment of the present invention. The illustrated pulse-echo ranging system 200a includes a radar device 30 and a target 20. Target 20 is positioned at a particular measurement location. Radar device 30 is placed at a reference position, and includes an antenna 30a, together with (as shown in FIG. 1), among other elements, a transmitter 32, a receiver 34, and an analyzer 36. Radar device 30 transmits or emits, via antenna 30a, electromagnetic pulses toward target 20, and receives, via antenna 30a, reflected pulses which include pulses reflected from target 20 toward radar device 30. Radar device 30 analyzes the relationship between transmitted and reflected pulses in order to calculate a distance between radar device 30 and target 20. In addition, or alternatively, target 20 may perform other ranging calculations.

As shown in FIG. 4, radar device 30 is mounted on a tripod 70 which is placed at a particular reference location. Similarly, target 20 is mounted on a tripod 80, which is placed at a particular measurement location.

Radar device 30 may, for example, comprise a micropower impulse radar (MIR) device as described above.

Figure 5:
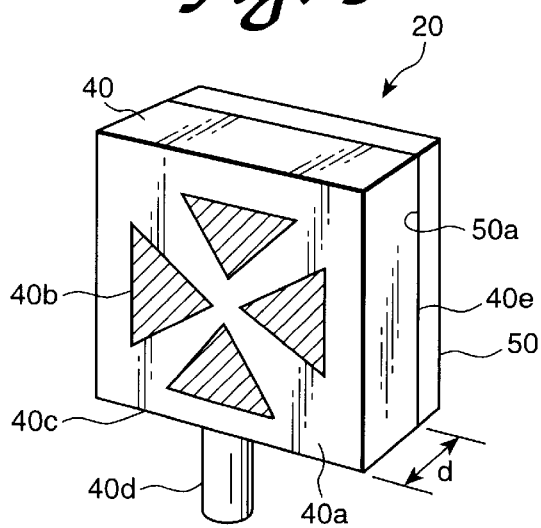
FIG. 5 is a perspective view of a target which may be used together with the pulse-echo ranging system illustrated in FIG. 4.

FIG. 5 provides a perspective view of target 20 shown in the pulse-echo ranging system 200a of FIG. 4. As shown in FIG. 5, target 20 includes a first reflector 40 and a second reflector 50 each of which reflects electromagnetic pulses emitted from radar device 30. First reflector 40 includes a first reflective surface 40a, and second reflector 50 includes a second reflective surface 50a. First reflective surface 40a is positioned closer to ranging device 30 than second reflective surface 50a by a distance equal to a thickness "d" of first reflector 40.

First reflective surface 40a is formed with material having a property of reflecting part of the electromagnetic pulses it emits from radar device 30, and is therefore semi-transparent to those emitted pulses. Second reflective surface 50a is formed with a material so that it is not transparent to the emitted pulses, and therefore reflects substantially all of the electromagnetic pulses it emits from radar device 30. The semi-transparent material of first reflective surface 40a reflects electromagnetic pulses falling within a specific frequency band, while it transmits electromagnetic pulses having frequencies outside of the specific frequency band. First reflective surface 40a may be made semi-transparent as described by forming first reflector 40 with, for example, a synthetic resin containing metal powder mixed therein. Second reflective surface 50a may be made non-transparent to the electromagnetic pulses by forming second reflector 50 with, for example, copper.

Second reflective surface 50a of second reflector 50 is attached to a rear surface 40e of first reflector 40. Site markings 40b are provided on the front surface (i.e., on the first reflective surface 40a ) of first reflector 40. A coupling pin 40d is further provided which extends from a bottom surface 40c of first reflector 40. As shown in FIG. 4, coupling pin 40d may be inserted to an attachment hole 90a of a supporting plate 90 fixed to the top of tripod 80, thereby fixing target 20 to tripod 80. In operation, target 20 is positioned so that first reflector 40 is closer to radar device 30 than second reflector 50, along a direction facing radar device 30, and the position of target 20 is adjusted so that first reflective surface 40a of first reflector 40 directly opposes radar device 30, and, preferably, is completely vertical. First reflective surface 40a is separated from second reflective surface 50a by a distance "d" which is equal to the thickness of first reflector 40.

First reflective surface 40a creates a first set of reflected pulses which are reflected back toward radar device 30, and second reflective surface 50a creates a second set of such reflected pulses. The materials of first and second reflectors 40 and 50 are preferably selected so that the ratio of an intensity of reflected pulses of the first set to an intensity of reflected pulses of the second set is a predetermined value.

The operation of the third embodiment pulse-echo ranging system will now be described. Referring to FIG. 4, target 20 is fixed on its tripod 80 at a position so that first reflective surface 40a directly opposes radar device 30, and the position of the measuring station (i.e., the position of interest) is vertically aligned with first reflecting surface 40a.

Radar device 30 emits electromagnetic pulses toward target 20, and a portion of those pulses are reflected by first reflective surface 40a to form a first set of reflected pulses, while another portion of the transmitted electromagnetic pulses pass through first reflector 40 and are then substantially completely reflected by second reflective surface 50a to form a second set of reflected pulses. Each of the first and second sets of reflected pulses is received at radar device 30. Radar device 30 may further receive other electromagnetic pulses and radiation caused by reflections of other objects behind or near target 20.

The first and second sets of reflected pulses can be distinguished from other electromagnetic radiation caused by objects other than target 20, since the pulses of the first set are delayed in time by an amount of time corresponding to thickness "d" of first reflector 40 (i.e., the distance between the first and second reflective surfaces 40a and 40b), and the first and second reflected pulses have a certain intensity ratio in relation to each other.

Radar device 30 may use one of the first and second sets of reflected pulses to calculate the distance from radar device 30 to target 20. In the specific illustrated embodiment, radar device 30 calculates the distance to target 20 with the use of the first set of reflected pulses, as reflected by first reflective surface 40a. Based upon the time delay between the adjacent electromagnetic pulses of the first set, the distance from radar device 30 to target 20 (i.e. the measurement station) can be obtained.

Figure 6:
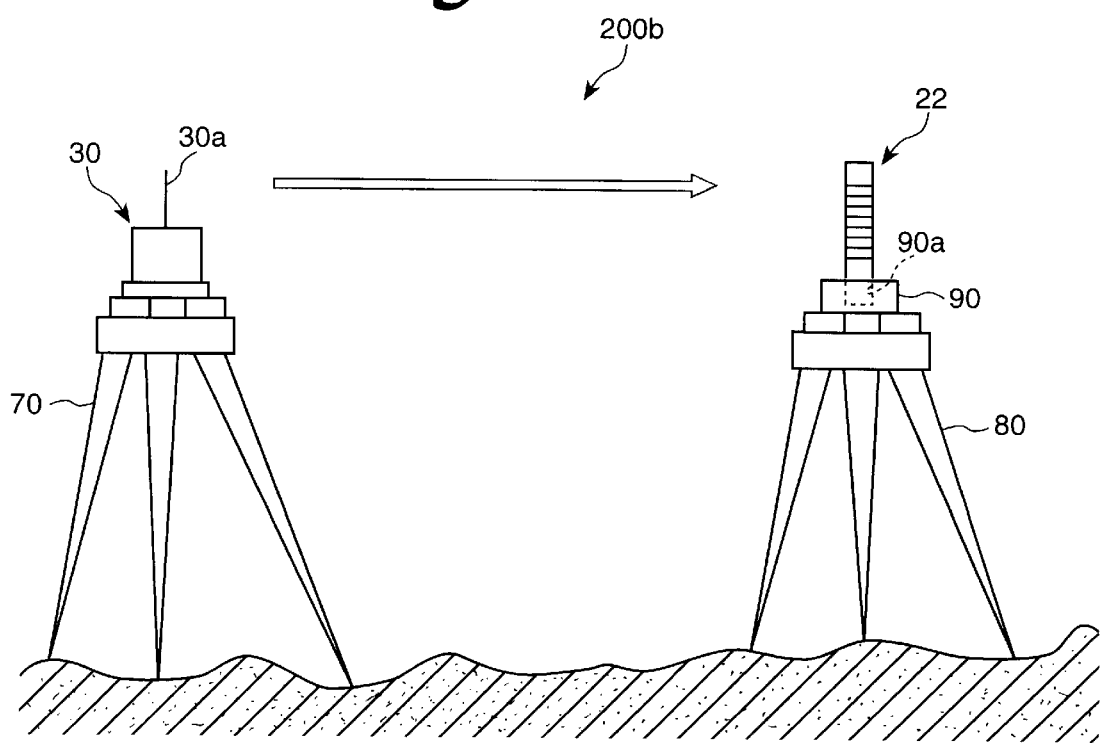
FIG. 6 illustrates a pulse-echo ranging system in accordance with a fourth embodiment of the present invention.
Figure 7:
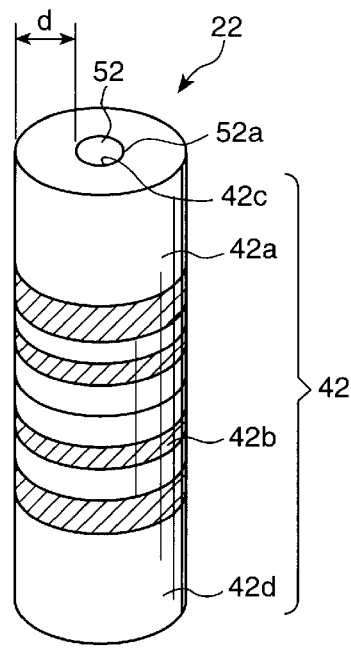
FIG. 7 is a perspective view of a target which may be used in the pulse-echo ranging system illustrated in FIG. 6.

FIG. 6 shows a pulse-echo ranging system 200b in accordance with a fourth embodiment of the present invention. FIG. 7 provides a perspective view of a target 22 which may be used in the pulse-echo ranging system 200b illustrated in FIG. 6.

In this embodiment, all of the components of the system are substantially identical to those provided in the previous embodiment shown in FIG. 4, with the exception of target 22. In this embodiment, target 22 comprises a first cylindrical reflector 42 and a second columnar reflector 52.

As shown in FIG. 7, first reflector 42 comprises a hollow cylinder having a wall thickness "d", and is made of a material that is partially transparent to radio waves being transmitted by radar device 30. On the first reflective surface (i.e. the outer peripheral surface) 42a of first reflector 42, site markings 42b are provided. Target 22 may be mounted to tripod 80 as shown in FIG. 6, by inserting a lower end portion 42d of first reflector 42 into attachment hole 90a of supporting plate 90.

Second reflector 52 is columnar (cylindrical) in shape, and is made of a material opaque to the radio waves being transmitted by radar device 30. Second reflector 52 is inserted into the columnar (cylindrical) hole of first reflector 42, so that the second reflective surface (i.e. the outer surface) 52a of second reflector 52 is in close contact with the inner surface 42c of first reflector 42. When target 22 is fixed to tripod 80 as shown in FIG. 6, first reflective surface 42a is closer to radar device 30 by a distance "d" which is equal to the thickness of first reflector 42.

The first reflective surface 42a creates a first set of reflected pulses, and the second reflective surface 52a creates a second set of reflected pulses. The materials used to form the first and second reflectors 42 and 52 are preferably selected so that the ratio of an intensity of the reflected pulses of the first set to an intensity of reflected pulses of the second set is a predetermined value.

The operation of the pulse-echo ranging system 200b will now be described. Target 22 is positioned at a particular location of interest, i.e. a measurement location, by fixing it to tripod 80. Tripod 80 is adjusted so that first reflective surface 42a is vertical and directly faces radar device 30. In addition, first reflective surface 42a should be in vertical alignment with the measurement location of interest, i.e. the precise position of the measurement station.

Radar device 30 emits electromagnetic pulses towards target 22. A portion of the electromagnetic pulses is reflected by first reflective surface 42a to form a first set of reflected pulses, and another portion of the electromagnetic pulses are transmitted through first reflector 42 and then reflected by second reflective surface 52a to create a second set of reflected pulses. Radar device 30 receives the first and second sets of reflected pulses together with other electromagnetic radiation which may comprise noise and other pulses generated by, for example, objects behind or near target 22.

Radar device 30 can distinguish the first and second sets of reflected pulses from such noise and extraneous pulses by taking into account the amount of time difference between the first and second sets of reflected pulses which corresponds to the thickness "d" of first reflector 42 (i.e. the distance between first and second reflective surfaces 42a and 52a), and further taking into account the known intensity ratio between the electromagnetic pulses of the first and second sets of reflected pulses.

Either of the first or second sets of reflected pulses can be used to determine the distance between radar device 30 and target 22. Since the first reflective surface 42a is in vertical alignment with the position of interest, in the illustrated embodiment, the first set of reflected pulses is used to determine the distance to target 22, based upon the time delay between adjacent ones of the first set of reflected pulses received by radar device 30.

Since first and second reflectors 42 and 52 are each cylindrical in shape, each of the first and second reflective surfaces 42a and 52a always directly opposes radar device 30, when it is vertically arranged. This facilitates easy adjustment of tripod 80 which supports target 22, and can quickly reduce the time required to set up the measurement station.

Figure 8:
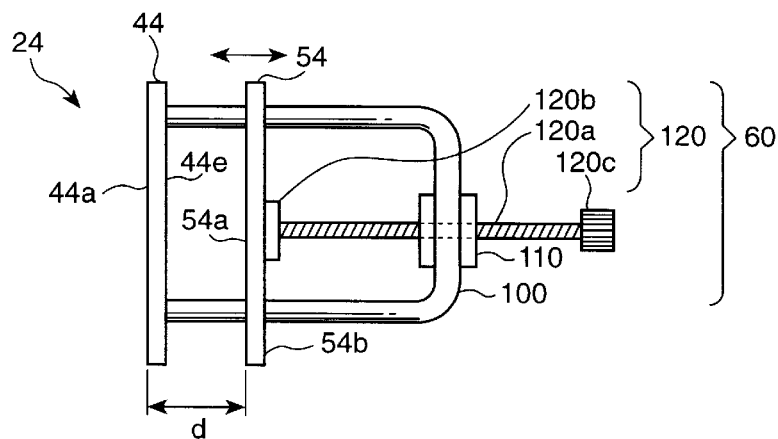
FIG. 8 provides a side view of a target provided as part of a pulse-echo ranging system in accordance with a fifth embodiment of the present invention.
Figure 9:
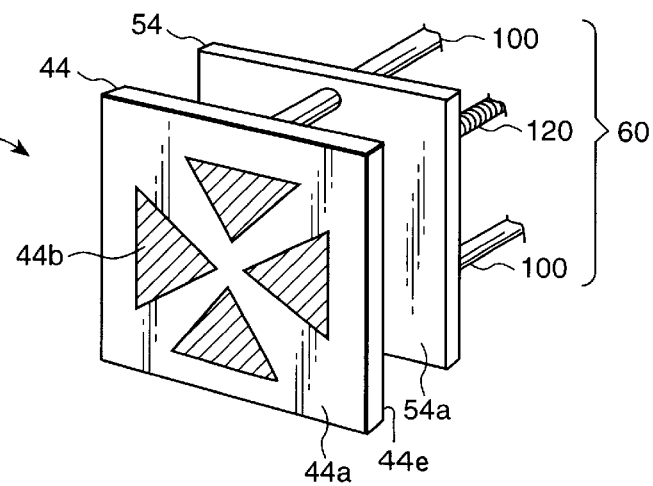
FIG. 9 is a perspective view of the target illustrated in FIG. 8.

FIG. 8 provides a side view of a target 24 which forms part of a pulse-echo ranging system in accordance with a fifth embodiment of the present invention. FIG. 9 is a perspective view of the target 24 illustrated in FIG. 8. The illustrated target 24 comprises a first reflector 44 and a second reflector 54. Target 24 further includes a distance adjustor 60 which firmly and adjustably holds first and second reflectors 44 and 54 in relation to each other. More specifically, the distance between a first reflective surface 44a of first reflector 44 and a second reflective surface 54a of second reflector 54 is adjustable.

First reflector 44 may comprise a substantially square-shaped thin plate, made of a material semi-transparent to radio waves being emitted by radar device 30. Second reflector 54 may also be a substantially square-shaped thin plate, made of a material not transparent to radio waves being emitted by radar device 30. The types of materials used to form first reflector 44 and second reflector 54 may be as described previously with respect to the third and fourth embodiments.

The distance adjustor 60 may include a U-shaped support member 100 fixed to a rear surface 44e of first reflector 44. A nut 110 and an adjustor rod 120 may further be provided which are fixed to support member 100. Second reflector 54 is supported by support member 100 to be movable along the direction of the arrow shown in FIG. 8. Adjustor rod 120 includes a threaded shaft 120a, which includes threads that are engaged with complementary threads on an inner cylindrical surface of nut 110. A thin plate 120b is provided on an end of threaded shaft 120a, and is fixed to a center portion of a rear surface 54b of second reflector 54. A knob 120c may be provided at the other free end of threaded shaft 120a.

By rotating knob 120c of adjustor rod 120, second reflector 54 may be guided by support member 100 and moved along the direction shown by the arrow in FIG. 8, thereby adjusting the distance "d" between first and second reflective surfaces 44a and 54a of first and second reflectors 44 and 54, respectively.

By providing a mechanism for adjusting the distance between the first and second reflective surfaces, e.g., as shown in FIGS. 8 and 9, each measuring station can be provided with a target having a different distance "d" between its first and second reflective surfaces. Accordingly, the distance "d" can be used to identify the particular measuring station from which reflected pulses originate. This makes it easier to identify from which measuring station reflected pulses originate, and can lead to more efficient ranging and surveying. In addition, various distances from different measuring stations can be measured at the same time, without manually recording or otherwise communicating the identity of each measuring station, since the identity of each measuring station forms part of the signals being received by radar device 30.

While the invention has been described by way of example embodiments, it is understood that the words which have been used herein are words of description, rather than words of limitation. Changes may be made, within the purview of the appended claims, without departing from the scope and spirit of the invention in its broader aspects. Although the invention has been described herein with reference to particular structures, components, means materials and embodiments, it is understood that the invention is not limited to the particulars disclosed. The invention extends to all equivalent structures, components, means, and uses such as are properly within the scope of the appended claims.

What is claimed is:

1. A pulse-echo ranging system comprising:

a target positioned at a measurement location; and a ranging device comprising a transmitter for emitting pulses of electromagnetic radiation toward said target and a receiver for receiving reflected pulses, wherein said ranging device comprising a radar device for emitting and receiving radio frequency electromagnetic radiation comprising said pulses reflected from said target toward said ranging device;

said target comprising a modulating mechanism for modulating said reflected pulses in a predetermined manner, wherein said modulating mechanism comprises a reflector which reflects said pulses at plural distances from said ranging device, wherein said reflector comprises first and second reflective surfaces, said first reflective surface being at a position closer to said ranging device than a position of said second reflective surface, wherein said first reflective surface is semi-transparent to said pulses and said second reflective surface is not transparent to said pulses, said first reflective surface creating a first set of reflected pulses and said second reflective surface creating a second set of reflected pulses, wherein a ratio of an intensity of reflected pulses of said first set to an intensity of reflected pulses of said second set being a predetermined value.

2. A pulse-echo ranging system comprising:

a target positioned at a measurement location; and a ranging device comprising a transmitter for emitting pulses of electromagnetic radiation toward said target and a receiver for receiving reflected pulses, wherein said ranging device comprising a radar device for emitting and receiving radio frequency electromagnetic radiation comprising said pulses reflected from said target toward said ranging device;

said target comprising a modulating mechanism for modulating said reflected pulses in a predetermined manner, wherein said modulating mechanism comprises a reflector which reflects said pulses at plural distances from said ranging device, wherein said reflector comprises a reflective surface and said modulating mechanism further comprises a vibrator for moving said reflective surface along a direction facing said ranging device, and wherein said target further comprises a tilt sensor for detecting an amount of tilt of said reflective surface to produce a tilt value, and a frequency setter for setting a frequency of oscillation of said vibrator in accordance with said tilt value produced by said tilt sensor.

3. A target for use in a pulse-echo ranging system, said target comprising a modulating mechanism for modulating in a predetermined manner reflected pulses of electromagnetic radiation transmitted toward said target from a ranging device, wherein said modulating mechanism comprises a reflector which reflects said pulses at plural distances from said ranging device, wherein said reflector comprises first and second reflective surfaces, said first reflective surface being at a position closer to said ranging device than a position of said second reflective surface, and wherein said first reflective surface is semi-transparent to pulses of electromagnetic radiation, and said second reflective surface is not transparent to said pulses or electromagnetic radiation, said first reflective surface creating a first set of reflected pulses and said second reflective surface creating a second set of reflected pulses, wherein a ratio of an intensity of reflected pulses of said first set to an intensity of reflected pulses of said second set being a predetermined value.

4. The target according to claim 3, further comprising a distance adjuster for adjusting a distance between said first and second reflective surfaces in accordance with a location at which said target is positioned.

5. A target for use in a pulse-echo ranging system, said target comprising a modulating mechanism for modulating in a predetermined manner reflected pulses of electromagnetic radiation transmitted toward said target from a ranging device, wherein said modulating mechanism comprises a reflector which reflects said pulses at plural distances from said ranging device, wherein said reflector comprises a reflective surface and said modulation mechanism further comprises a vibrator for moving said reflective surface along a direction facing said ranging device, and a tilt sensor for detecting a tilt of said reflective surface to produce a tilt value, and a frequency setter for setting a frequency of oscillation of said vibrator in accordance with the tilt value produced by said tilt sensor.

* * * * *